(12) United States Patent
Rahim et al.

(10) Patent No.: US 8,332,226 B1
(45) Date of Patent: Dec. 11, 2012

(54) SYSTEM AND METHOD OF DYNAMICALLY MODIFYING A SPOKEN DIALOG SYSTEM TO REDUCE HARDWARE REQUIREMENTS

(75) Inventors: Mazin G. Rahim, Warren, NJ (US); Juergen Schroeter, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1164 days.

(21) Appl. No.: 11/030,923

(22) Filed: Jan. 7, 2005

(51) Int. Cl.
*G10L 21/00* (2006.01)

(52) U.S. Cl. .................... 704/270.1; 704/231; 704/270; 704/275

(58) Field of Classification Search .................. 704/270, 704/270.1, 275
See application file for complete search history.

(56) References Cited

U.S. PATENT DOCUMENTS

| | | | |
|---|---|---|---|
| 6,058,366 A * | 5/2000 | Tarkiainen et al. | 704/270 |
| 6,513,009 B1 * | 1/2003 | Comerford et al. | 704/270 |
| 6,629,075 B1 * | 9/2003 | Schalkwyk | 704/270 |
| 6,862,570 B2 * | 3/2005 | Schalkwyk | 704/270 |
| 7,174,297 B2 * | 2/2007 | Guerra et al. | 704/270.1 |
| 7,421,691 B1 * | 9/2008 | Hancock et al. | 718/100 |
| 2004/0199393 A1 * | 10/2004 | Arizmendi et al. | 704/277 |
| 2004/0225499 A1 * | 11/2004 | Wang et al. | 704/257 |
| 2004/0225902 A1 * | 11/2004 | Cesare et al. | 713/300 |

* cited by examiner

*Primary Examiner* — Douglas Godbold

(57) ABSTRACT

A system and method for providing a scalable spoken dialog system are disclosed. The method comprises receiving information which may be internal to the system or external to the system and dynamically modifying at least one module within a spoken dialog system according to the received information. The modules may be one or more of an automatic speech recognition, natural language understanding, dialog management and text-to-speech module or engine. Dynamically modifying the module may improve hardware performance or improve a specific caller's speech processing accuracy, for example. The modification of the modules or hardware may also be based on an application or a task, or based on a current portion of a dialog.

18 Claims, 3 Drawing Sheets

//11 8,332,226 B1

SYSTEM AND METHOD OF DYNAMICALLY MODIFYING A SPOKEN DIALOG SYSTEM TO REDUCE HARDWARE REQUIREMENTS

BACKGROUND OF THE INVENTION

1. Field of the Invention

The present invention relates to spoken dialog systems and more specifically to a system and method for dynamically adjusting components within a spoken dialog system according to network loads and other requirements to reduce hardware requirements.

2. Introduction

Any spoken dialog system, for example, to automate a call center, must operate on one or more compute devices such as a server. When a company desires to implement a spoken dialog system, one component of planning and implementing the system is a prediction of the number of calls that the system should be able to manage simultaneously. As the number of predicted calls increases, then more computer resources must be purchased and deployed to manage the load. The hardware costs of implementing such as system may make implementation of a spoken dialog system unaffordable.

Hardware costs in the initial acquisition and maintenance of a dialog system are an important consideration when planning call center automation with voice-enabled services. One common practice is to plan for assumed peak loads in terms of simultaneous users. Each user or caller into the system may be assigned a port. Hardware planning based on being able to manage peak loads is not cost efficient given that the average load might be significantly lower than the expected peak load.

What is needed in the art is a method for improving the efficiency of the use of computer resources when implementing a spoken dialog system.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the problems in the prior art by making the various speech engines used in a spoken dialog system (engines or modules for automatic speech recognition (ASR), text-to-speech (TTS), natural language understanding (NLU) and dialog manager (DM)) scalable and adaptable to the current load of the hardware the engines are running on. Dynamically adapting the speech engines to the existing user load allows for a much more efficient exploitation of available hardware resources with the effect of lower hardware investments.

The invention comprises systems, methods and computer readable media for providing a scalable spoken dialog system are disclosed. The method comprises receiving information which may be internal to the system or external to the system and dynamically modifying at least one module within a spoken dialog system according to the received information. The modules may be one or more modules such as an automatic speech recognition, natural language understanding, dialog management and text-to-speech module or engine. Dynamically modifying the module may improve hardware performance or improve a specific caller's speech processing accuracy, for example.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
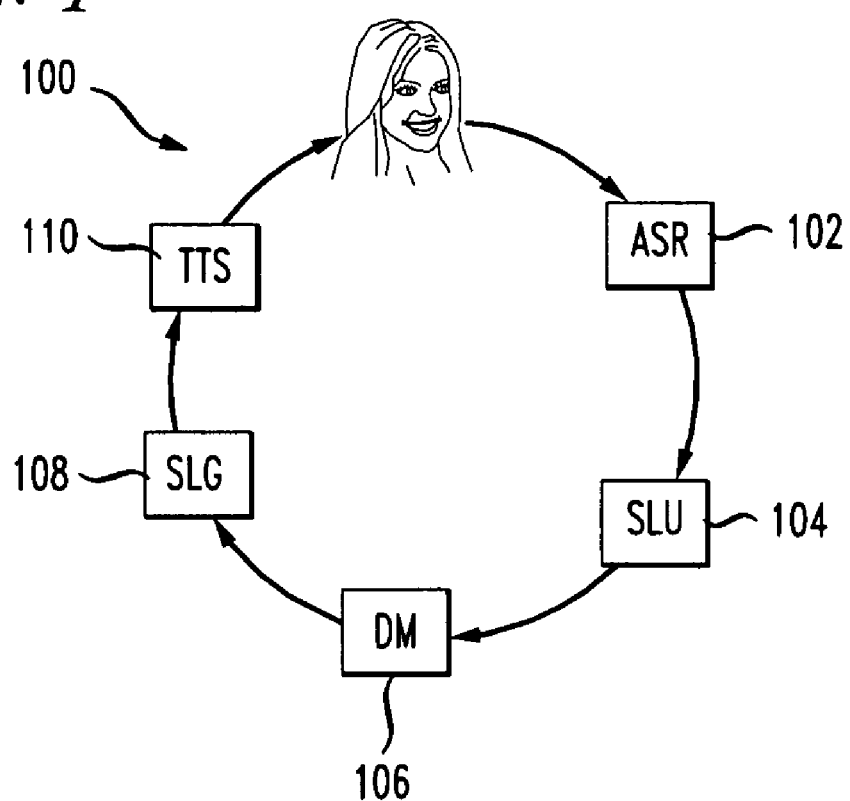
FIG. 1 illustrates the basic components of a spoken dialog system.

Spoken dialog systems aim to identify the intent of the person who provides a natural language input and take actions accordingly to satisfy the requests. FIG. 1 is a functional block diagram of an exemplary natural language spoken dialog system 100. Natural language spoken dialog system 100 may include an automatic speech recognition (ASR) module 102, a natural language understanding (NLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from NLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

Figure 2:
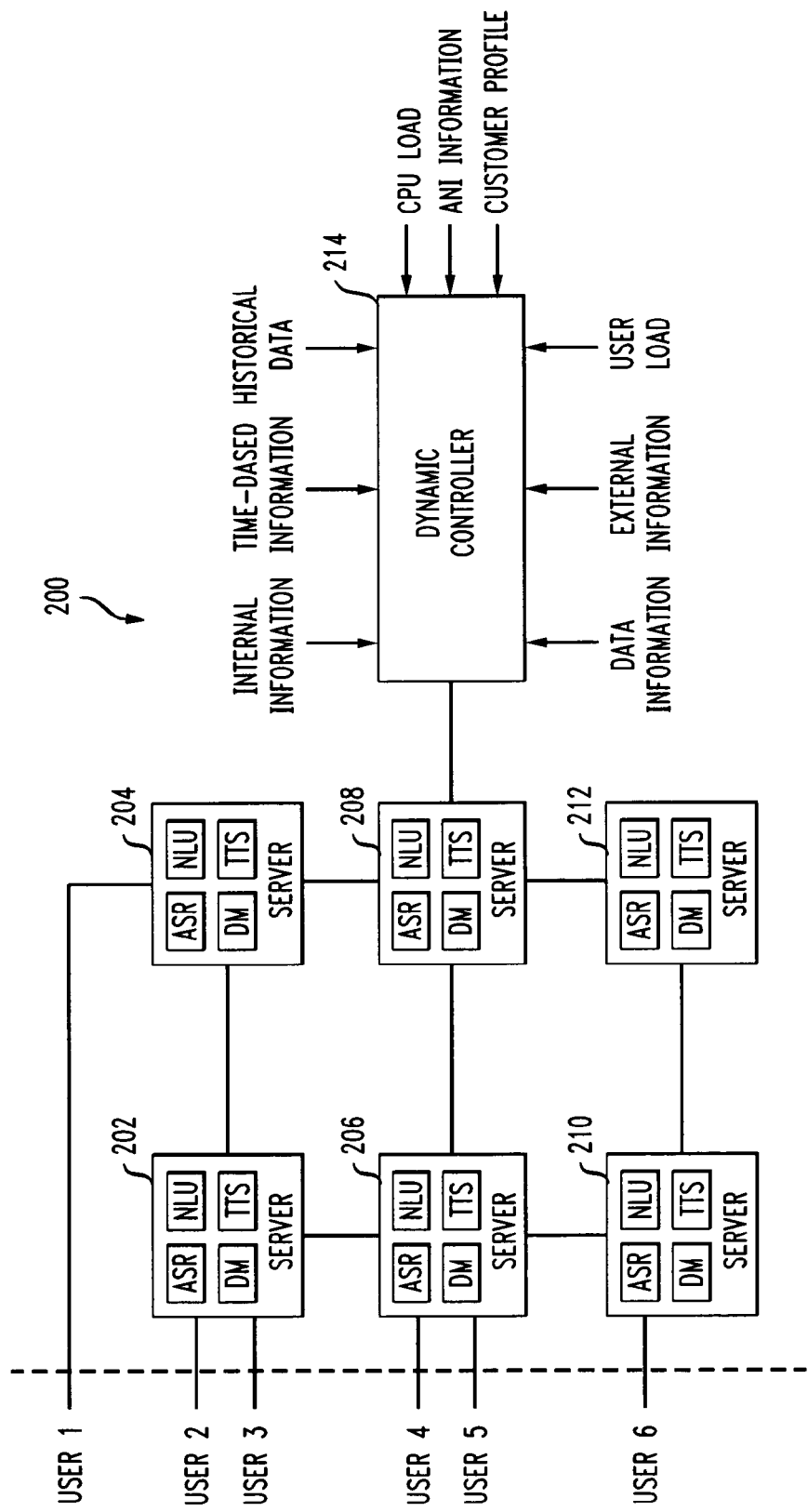
FIG. 2 illustrates an exemplary computer network upon which a spoken dialog system is deployed.

A compute resource may be defined as any hardware resource such as a central processing unit, harddisk space, memory, bandwidth for high speed communication of data, random access memory and so forth. FIG. 2 illustrates an exemplary processing system 200 comprising a plurality of compute devices such as computer servers 202, 204, 206, 208, 210, 212 are networked together in a computer cluster or computer farm to manage the calls coming from users which one or more of the modules of system 100 may be implemented. Each server will run one or more of the speech processing modules (ASR, NLU, DM, TTS). FIG. 2 illustrates various callers 1-6 and their ports connecting each caller to a speech processing server. As is known in the art, a server may include such hardware elements as a bus, a processor or processors, memory, a read only memory (ROM), a storage device, an input device, an output device and a communication interface. Bus may permit communication among the components of system. As hardware components change and improve, these elements may change without changing the principles of the invention. Since these are common hardware components, they are not shown in the figures but are discussed herein.

A processor in the servers may include at least one conventional processor or microprocessor that interprets and executes instructions. The memory may be a random access memory (RAM) or another type of dynamic storage device that stores information and instructions for execution by the processor. The memory may also store temporary variables or other intermediate information used during execution of instructions by processor. The ROM may include a conventional ROM device or another type of static storage device that stores static information and instructions for processor. Storage device may include any type of media, such as, for example, magnetic or optical recording media and its corresponding drive.

Input device may include one or more conventional mechanisms that permit a user to input information to the system, such as a keyboard, a mouse, a pen, a voice recognition device, etc. The output device may include one or more conventional mechanisms that output information to the user, including a display, a printer, one or more speakers, or a medium, such as a memory, or a magnetic or optical disk and a corresponding disk drive. The communication interface may include any transceiver-like mechanism that enables system to communicate via a network and with other computers. For example, communication interface may include a modem, or an Ethernet interface for communicating via a local area network (LAN). Alternatively, communication interface may include other mechanisms for communicating with other devices and/or systems via wired, wireless or optical connections.

The system 200 may perform such functions in response to processor executing sequences of instructions contained in a computer-readable medium, such as, for example, memory, a magnetic disk or an optical disk. Such instructions may be read into memory from another computer-readable medium, such as storage device or from a separate device via communication interface.

Any speech engine (ASR, TTS, NLU, or DM) is designed to work at a certain fixed operating point of its performance curve. Performance is usually specified in terms of "accuracy" (% correct) over a real-time factor such as how much time the speech engine takes to complete a task. The designer of a speech system chooses an operating point for each speech engine employed in the system. This choice, once made, ultimately determines how many simultaneous users can be handled per computing resource (CPU), given a specific application with a specific breakdown in terms of relative time (% of time) usage for each of the speech engines that deliver the service as a group (ASR, TTS, NLU, DM).

For example, a given application could have the average users spend 70% of time talking to the service (ASR), 20% listening to the service (TTS) and 10% waiting for system responses (NLU and DM). Given a target for the peak number of users, which defines the peak system load, the designer then is able to calculate the number of servers or CPUs needed to carry the desired number of simultaneous users. The current invention provides voice-enabled applications with the ability to operate in a dynamic mode which can improve the efficiency of the system and reduce the cost and expense in hardware.

According to one aspect of the invention, the specific system configurations at the speech engine levels including the operation and function of all or any one of the ASR, NLU, DM and TTS modules may be automatically and dynamically adjusted while deployed based on the given application/task, and perhaps even on a call-by-call basis and on a caller basis. The adjustments are made based on internal or external information, which may include, for example, CPU load, automatic number identification (ANI) information, customer profile, number of users, predictions of high usage due to sales or power outages or special offers, etc. The invention exploits the algorithmic choices that are inherent in each of the different kinds of speech engines. For example, by choosing a smaller beam width in searching candidates, the ASR and TTS modules can speed up their response time considerably with mostly a small degradation in accuracy or synthesized voice quality. This trade-off in accuracy versus speed is done dynamically based on the various internal or external information fed to the system, such as the load requirements and accuracy expectations. In FIG. 2, the server 214 is shown as the dynamical controller. This server receives the internal and external information and communicates via the network with the speech engines on the various servers. The controller 214 will provide instructions to one or more speech engine to modify its operation according to the external or internal information. The information may be to adjust its operating point such that lower accuracy is achieved but will allow for a higher user load. The instructions may also be to provide higher accuracy with a lower user load.

Several examples illustrate this invention. One example may be time-based. If there is a time of day such as the evening or the weekend where usage is low, the controller may instruct the speech engines to increase accuracy since there are fewer callers. During busy call times, the controller may instruct the speech engines to speed up operations (at a reduced accuracy) to manage the additional callers to the system. In another example, when the system is not working at its peak load, the configurations can be dynamically set so that maximum accuracy is obtained. Another example provides for adjusting the DM speech engine. Extreme loads could be handled by switching from a computationally intensive mode of dialog such as a "how may I help you?"—type, user-initiative dialog, to a less demanding mode of machine directed dialog. This dynamic switch in operation mode could reduce computational requirements by a large factor. It is preferable that taking the drastic measure of switching dialog modes would occur when a threshold load level is reached that is extremely high. In a more normal range of operation, trading off accuracy against speed of the speech engines would suffice.

Implementing a load-scalable voice service requires a new software module for managing the load and also requires the speech engines to be altered to enable scaling dynamically and to receive communications from the new controller module 214 to perform the scaling. The load controller 214 will identify parameters for the speech engines such as the appropriate operating points plus make appropriate choices regarding which dialog mode to use.

As can be appreciated, although the dynamic controller 214 is shown as a separate server, there is no limitation regarding where this module runs and whether it is on a single server or on several servers.

Another aspect of the invention relates to adapting or modifying one or more of the speech modules or algorithms and hardware resources according to determined information about an application or a particular task. For example, a customer care application, a technical help desk application and a sales application may each need a different mix of operating points for resources. Since the same server farm may be used for several different applications, the resources may be reconfigured for the current application-based needs. Further, the resources may be reconfigured according to things occurring within an application, such as depending on the turn of the dialog or the particular task (i.e., a different configuration for an initial welcoming portion of the dialog versus the portion of the dialog where account information is received or when the user is transferred to a human agent).

Figure 3:
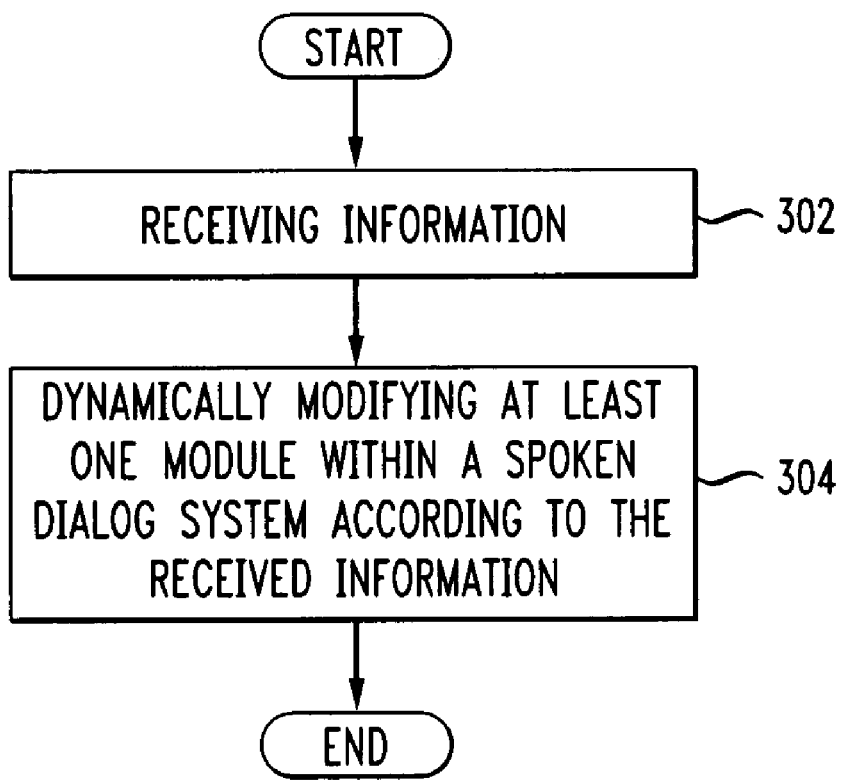
FIG. 3 illustrates a method embodiment of the invention.

FIG. 3 illustrates a method embodiment of the invention. As shown in FIG. 3, the method comprises receiving information (302) and modifying at least one module within a spoken dialog system according to the received information (304). The information may relate to the performance of spoken dialog system, or may be internal or external to the system. For example, the information may relate to a customer profile and purchase history. Each caller may have a rating which identifies an operating point (quality of service, high or low accuracy, etc. for their call). The modification may, for example, improve the experience for a particularly high-valued caller or more efficiently utilize compute resources upon which the spoken dialog system runs. The various types of information that may be received for the purpose of adjusting one or more speech engines are set forth above. These include, for example, internal information such as CPU load, time-based information such as it is the weekend which means a reduced calling load, historical information such as historically, after a power outage, we hit peak usage limits, external information such as data from the marketing department that a sale will begin next week and so forth. When the adjustment are made on a call-by-call basis or based on ANI or customer profile information, the system may receive information that the customer purchases a lot of products from the company, and therefore the system may automatically improve the accuracy of that call. Also as mentioned above, individual speech engines may be modified according to various parameters particularly associated with that speech engine or based on a modification of the operating point for each speech engine.

Making the kind of dynamic adjustments and modifications to one or more speech engines according to the principles of the invention may not only reduce the hardware costs associated with a spoken dialog system but may also improve revenue and efficiency by modifying the experience for high value customers and enabling the system to communicate with more customers simultaneously. Other benefits may be identified through practice of the invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
    receiving a time of day and an associated prediction of call volume to a spoken dialog system based on a time limited special offer; and
    modifying, via a processor, a dialog manager module within the spoken dialog system according to the time of day and the associated prediction of call volume, from a first dialog mode to a second dialog mode, wherein modifying the dialog manager module results in a change of computational intensity for the spoken dialog system.

2. The method of claim 1, wherein modifying the dialog manager module within the spoken dialog system further comprises modifying an automatic speech recognition module, a natural language understanding module, and a text-to-speech module.

3. The method of claim 2, further comprising:
receiving a plurality of calls to the spoken dialog system, and wherein modifying the dialog manager module within the spoken dialog system occurs on a call-by-call basis.

4. The method of claim 2, wherein modifying the dialog manager module within the spoken dialog system further comprises modifying each of the automatic speech recognition module, the natural language understanding module and the text-to-speech module according to parameters individually associated with each respective module.

5. The method of claim 4, further comprising, when both the automatic speech recognition module and the text to speech module are modified, selecting a smaller beam width in searching candidates, wherein hardware requirements for the spoken dialog system may be reduced.

6. The method of claim 1, wherein modifying the dialog manager module within the spoken dialog system further comprises modifying an accuracy operating point of the dialog manager module.

7. The method of claim 1, wherein the change in computation intensity occurs when a compute load level surpasses a predetermined threshold.

8. The method of claim 1, wherein modifying the dialog manager module within the spoken dialog system further comprises modifying an accuracy of the dialog manager module to speed up a response time.

9. The method of claim 1, wherein modifying the dialog manager module within the spoken dialog system further comprises adjusting a predetermined operating point.

10. The method of claim 1, wherein modifying the dialog manager module more efficiently utilizes compute resources upon which the spoken dialog system runs.

11. The method of claim 1, further comprising:
receiving a plurality of calls to the spoken dialog system, and wherein modifying the dialog manager module is based on received information about a particular caller.

12. A system comprising:
a processor; and
a computer-readable storage medium storing instructions which, when executed by the processor, cause the processor to perform a method comprising:
receiving a time of day and an associated prediction of call volume to the spoken dialog system based on a time limited special offer; and
modifying a dialog manager module within the spoken dialog system, according to the time of day and the associated prediction of call volume, from a first dialog mode to a second dialog mode, wherein modifying the dialog manager module results in a change of computational intensity of the spoken dialog system.

13. The system of claim 12, wherein the computer-readable storage medium stores additional instructions which result in the method further comprising:
receiving a plurality of calls to the spoken dialog system, and wherein modifying the dialog manager module within the spoken dialog system occurs on a call-by-call basis.

14. The system of claim 12, wherein modifying the dialog manager module further comprises modifying an accuracy operating point of the dialog manager module.

15. The system of claim 12, wherein the computer-readable storage medium stores additional instructions which result in the method further comprising:
receiving a plurality of calls to the spoken dialog system; and
wherein modifying the dialog manager module within the spoken dialog system is further based on a rating assigned to each particular caller of the plurality of calls.

16. A non-transitory computer-readable medium storing instructions for controlling a computing device to perform a method comprising:
receiving a time of day and an associated prediction of call volume to a spoken dialog system based on a time limited special offer; and
modifying a dialog manager module within the spoken dialog system, according to the time of day and the associated prediction of call volume received, from a first dialog mode to a second dialog mode, wherein modifying the dialog manager module results in a change of computational intensity for the spoken dialog system.

17. The non-transitory computer-readable storage medium of claim 16, wherein the spoken dialog system is associated with one of a customer care application, a technical help desk application and a sales application.

18. The non-transitory computer-readable storage medium of claim 16, wherein modifying the dialog manager module within the spoken dialog system further comprises modifying a hardware resource.

* * * * *